Figure 1:
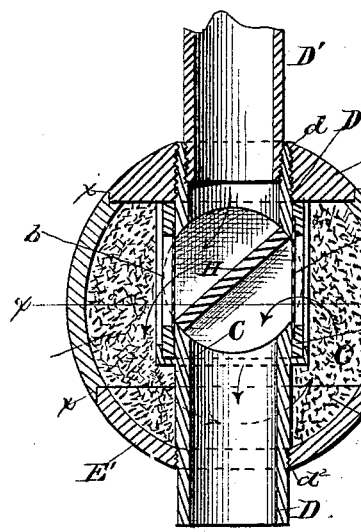

(No Model.)

P. WELLS.
Filtering Apparatus.

No. 242,495. Patented June 7, 1881.

Attest,
W. H. H. Knight,
F. H. Hale

Parker Wells.
Inventor.
By his Atty. H. Clay Smith

UNITED STATES PATENT OFFICE.

PARKER WELLS, OF LYNN, MASSACHUSETTS.

FILTERING APPARATUS.

SPECIFICATION forming part of Letters Patent No. 242,495, dated June 7, 1881.

Application filed February 15, 1881. (No model.)

*To all whom it may concern:*

Be it known that I, PARKER WELLS, a citizen of the United States, residing at Lynn, in the State of Massachusetts, have invented certain new and useful Improvements in Filtering Apparatus; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to a new and useful improvement in water-filters of that class which are adapted for service upon the branch pipe of the street-main at any desired point between the said main and the service or distributing pipes within a dwelling, hall, building, or block, or in the mains themselves; and the novelty consists in the construction, arrangement, and adaptation of parts, as will be more fully hereinafter set forth, and specifically pointed out in the claims.

The objects of the invention are, first, to thoroughly filter, cleanse, and purify the supply-water while passing through the pipes by an attached filtering device and material; second, to cleanse the filtering material at will, and eliminate the sediment which is allowed to escape; and, third, to direct the line of travel of the current of water through the filtering material in either of two directions, or reverse the current at will, in order to take advantage of the greatest purifying effect of the filtering material, or to "swash" and cleanse the same, as will be explained.

In carrying out the invention I employ the following mechanical parts: I cast in one piece a hollow body, comprising approximately one-half of a globe and a contained rectangular hollow frame, attached to each other at the corners, and leaving a surrounding chamber for the filtering material. Upon opposite sides the rectangular frame is provided with openings, and the body and frame upon one side, which, for convenience, I will designate as the front, with an aperture which receives an operating-valve. Through this opening the frame is properly reamed out, in any manner well known to skilled mechanics, to form a circular recess upon the back of the frame, which receives the back disk of the valve. The disks are connected by a plate of a width equal to the diameter of the disks, this plate being adapted to rest above the water-aperture upon one side, and below the opposite aperture. This action of the valve forces the water-current to pass out of one of the side apertures around through the filtering-chamber and back through the other aperture under the valve, and thence to the service-pipes. A projecting valve shank and knob allows the operator to give a quarter-turn to the valve and reverse the current to clean the filtering material. A gauze frame working in guides operates upon either of two sides of the rectangular frame, to cover the apertures, to hold the filtering material in place, and to allow the water to pass through in either direction as it is guided by the operator.

It will be observed that an eighth-turn allows the valve to stand vertical, and the water to pass directly through the pipes, and not through the filtering-chamber.

Each end of the body has a cap secured thereon by thread-connections of such conformation as to afford a globe shape to the device, and each cap has proper water-pipe connections.

It being understood that all the articulations must of necessity be water-tight, disks or rings of leather or other proper material are employed.

I prefer, as shown, that the pipe-connections may be cast with the body and rectangular portion; but said connections may be cast with the caps, if desired.

Figure 2:
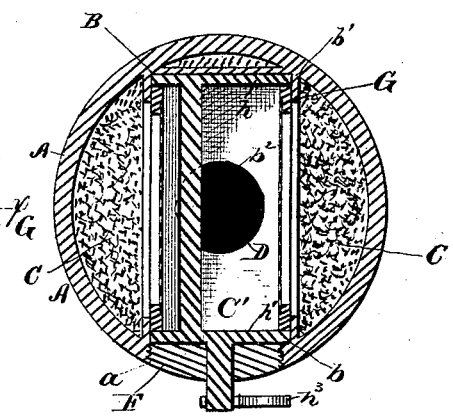
Figure 3:
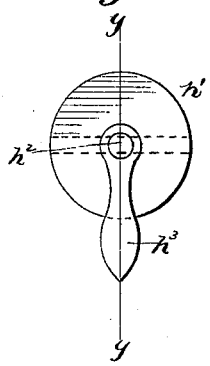
Figure 4:
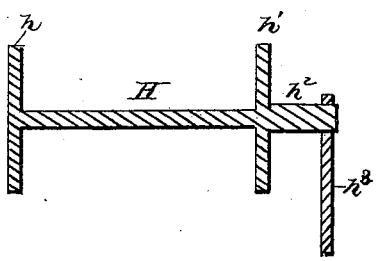
Figure 5:
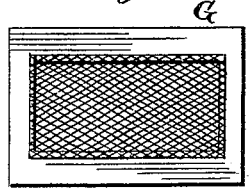

In the accompanying drawings, which form a part of this specification, Figure 1 is a central vertical section; Fig. 2, a horizontal section through the line $x\ x$ of Fig. 1; and Figs. 3, 4, and 5 are details.

Referring to the drawings, A represents the body, having front aperture, $a$; and B, the contained rectangular frame, having side apertures, $b$, disk-seats $b'\ b'$, and valve-opening $b^2$, cast in one piece to form filtering-chamber C and valve-chamber C'.

Extending above and below the rectangular inclosed frame, and cast in one therewith, are pipes D $D^2$, the upper one, D, of which has an external thread, $d$, by means of which a corresponding female thread allows the upper cap, E, to be properly seated between the flanges $x\ x$, and an internal thread allows the pipe D' to form a tight connection, and the lower cap, F', is similarly secured over the pipe $D^2$ by thread $d^2$.

Within the front aperture, $a$, is inserted the valve, which consists of the inner disk, $h$, which seats in $b'$ in the back of the rectangular frame, and disk $h'$, which seats in the front of the same, these disks being connected by the plate H, which is the valve proper. A shank, $h^2$, projects outward through the aperture $a$, and through a proper water-tight cap, F, and is provided upon its extremity with a knob or lever, $h^3$.

G represents a gauze frame, which is adapted to serve over either of the side apertures, $b$, to hold the filtering material in place, and to allow the current of water to flow in either direction, as guided by the operator, through the devices H $h^2$ $h^3$.

The valve H is adapted to seat properly upon the diagonally-opposite corners of the frame B, or parts D $D^2$, in such a manner as to close the direct channel and to force the water around through the filtering material. This current may be reversed at will, or by an eighth-turn of the lever the water may be allowed to flow direct, as may be desired.

Various modifications may be made without departing from the principle or sacrificing the advantages of my invention, the essential parts of which are fully described and shown.

What I claim as new is—

1. A water-filter provided with removable pipe-connections, and a body having a contained rectangular frame and connecting-pipes cast in one piece therewith, and having intervening filtering-chamber connected by apertures, said apertures being provided with gauze frames, and being governed by a three-way valve or deflector operated from the outside, to either reverse the current through the filtering material at will or allow it to pass directly through the valve-chamber, as specified.

2. The combination of the body A, having aperture $a$, and contained rectangular frame B, having side apertures, $b$, disk-seats $b'$, and valve-opening $b^2$, cast in one piece to form valve-chamber C and filtering-chamber C', with the caps E E' and a suitable shifting-valve, as and for the purposes set forth.

3. The body A $a$ and contained rectangular frame B $b$ $b'$ $b^2$, cast in one piece to form chambers C C', the caps E and E', having pipe-connections, and the valve H $h$ $h'$ $h^2$, having external operating means, $h^3$, all constructed and combined to operate as and for the purp set forth.

4. The combination of the body A $a$ and contained rectangular frame, made in one piece, with the gauze frames G, the three-way valve or deflector, and outside operating means, as shown, for the purposes described.

In testimony whereof I affix my signature in presence of two witnesses.

PARKER WELLS.

Witnesses:
JOSEPH FORREST,
H. CLAY SMITH.